US012364377B2

(12) United States Patent
Vonk et al.

(10) Patent No.: US 12,364,377 B2
(45) Date of Patent: Jul. 22, 2025

(54) VACUUM CLEANER

(71) Applicant: KONINKLIJKE PHILIPS N.V., Eindhoven (NL)

(72) Inventors: Arjan Sander Vonk, Eindhoven (NL); Johannes Tseard Van Der Kooi, Eindhoven (NL); Matthijs Hendrikus Lubbers, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 18/013,857

(22) PCT Filed: Jun. 16, 2021

(86) PCT No.: PCT/EP2021/066233
§ 371 (c)(1),
(2) Date: Dec. 29, 2022

(87) PCT Pub. No.: WO2022/002591
PCT Pub. Date: Jan. 6, 2022

(65) Prior Publication Data

US 2023/0172412 A1 Jun. 8, 2023

(30) Foreign Application Priority Data

Jun. 29, 2020 (EP) .................................... 20182828

(51) Int. Cl.
*A47L 9/16* (2006.01)
*A47L 5/28* (2006.01)
(Continued)

(52) U.S. Cl.
CPC ............... *A47L 9/1608* (2013.01); *A47L 5/28* (2013.01); *A47L 9/165* (2013.01); *A47L 9/1666* (2013.01);
(Continued)

(58) Field of Classification Search
CPC ...... A47L 9/1608; A47L 9/165; A47L 9/1666; A47L 9/1683; A47L 9/2884; A47L 5/28;
(Continued)

(56) References Cited

U.S. PATENT DOCUMENTS 6,332,239 B1 12/2001 Dubos et al.
8,161,599 B2 4/2012 Griffith et al.
(Continued)

FOREIGN PATENT DOCUMENTS

CA 2915198 A1 6/2016
EP 0 923 992 B1 7/2003
(Continued)

OTHER PUBLICATIONS

Extended European Search Report issued in connection with corresponding EP Application No. 20182828.2 dated Dec. 11, 2020.

*Primary Examiner* — Edward F Landrum
*Assistant Examiner* — Caleb Andrew Holizna
(74) *Attorney, Agent, or Firm* — Maschoff Brennan

(57) ABSTRACT

A vacuum cleaner is described. The vacuum cleaner has a dirt inlet and a motor and fan for delivering suction to the dirt inlet. A cyclone unit separates particles from a suction flow. The cyclone unit has a vortex finder extending along a cyclone axis of rotation and an annular chamber formed around outside of the vortex finder. Air is delivered to the cyclone unit in a forward direction (i.e. in a direction from the dirt inlet to the cyclone unit). The cyclone axis of rotation is substantially parallel to the forward direction. An outlet from the vortex finder is at a backward end thereof such that the outlet is in an opposite direction to a forward component. A space beyond the vortex finder is a part of a dirt collection area, thus enabling a more effective collection of hairs and other debris.

9 Claims, 6 Drawing Sheets

(51) Int. Cl.

| | |
|---|---|
| ***A47L 9/28*** | (2006.01) |
| ***B04C 3/06*** | (2006.01) |
| ***B04C 9/00*** | (2006.01) |

(52) U.S. Cl.
CPC ........... *A47L 9/1683* (2013.01); *A47L 9/2884* (2013.01); *B04C 3/06* (2013.01); *B04C 9/00* (2013.01); *B04C 2009/002* (2013.01); *B04C 2009/005* (2013.01)

(58) Field of Classification Search
CPC .......... A47L 7/0004; A47L 9/16; A47L 9/102; B04C 3/06; B04C 9/00; B04C 2009/002; B04C 2009/005
USPC ............................................................ 15/347
See application file for complete search history.

(56) References Cited

U.S. PATENT DOCUMENTS

| | | | | |
|---|---|---|---|---|
| 2014/0237764 | A1* | 8/2014 | Conrad | .................. A47L 9/165 55/318 |
| 2017/0303754 | A1* | 10/2017 | Conrad | ................ A47L 9/2873 |

FOREIGN PATENT DOCUMENTS

| | | | |
|---|---|---|---|
| EP | 1774888 | A2 | 4/2007 |
| EP | 3033981 | B1 | 8/2017 |
| EP | 3381343 | A1 | 10/2018 |
| FR | 2860134 | A1 | 4/2005 |
| RU | 2316245 | C2 | 2/2008 |
| WO | 2018178086 | A1 | 10/2018 |

* cited by examiner

VACUUM CLEANER

CROSS-REFERENCE TO RELATED APPLICATIONS

The present application is a U.S. National Phase application under 35 U.S.C. § 371 of International Application No. PCT/EP2021/066233, filed on Jun. 16, 2021, which claims the benefit of European Patent Application No. 20182828.2, filed on Jun. 29, 2020. These applications are hereby incorporated by reference herein.

FIELD OF THE INVENTION

This invention relates vacuum cleaners, and in particular it relates to vacuum cleaners using a cyclone unit.

BACKGROUND OF THE INVENTION

It is well known to use cyclone units in vacuum cleaners for separating dirt from a flow of air.

In cyclonic systems, centrifugal forces arise by rotating air inside a chamber. The air flows in a helical pattern, for example beginning at the top of the cyclone chamber and ending at the bottom, before exiting the cyclone through the center of the cyclone and out of the top. Particles dragged along in the rotating stream have too much inertia to follow the tight curve of the air flow path, and will strike the outside wall, then move along the wall to the bottom of the cyclone chamber (or enter a separate dirt collection chamber) where they can be removed.

Cyclone units are widely used as a way to separate dry particles from air. Cyclone units are also used to separate water droplets (and dirt particles) from air in the case of wet vacuum cleaners.

Typically, the cyclone has a central vortex finder in the form of a hollow cylinder shaped plastic part with slots along the length allowing air to flow into it. Cyclones work well, with efficient separation, as long as the airflow is not obstructed, because the main contributor to the filtering function is the airspeed. Therefore, as soon as a cyclone starts to be polluted, the airflow in the system reduces, resulting in a reduced separation efficiency causing more pollution.

One common cause of an airflow obstruction is the collection of hairs or other strands. This can give rise to the need to frequently clean the cyclone. The cleaning typically needs to be done manually, requiring the user to touch some of the dirt and hairs collected from the floor.

FR 2 860 134 and EP 1 774 888 each disclose a cyclone unit in which air enters at the top and exits at the bottom.

A design would be desirable which is less prone to clogging by hairs and other debris, in order to reduce the cleaning requirements for the cyclone unit.

SUMMARY OF THE INVENTION

The invention is defined by the claims.

According to examples in accordance with an aspect of the invention, there is provided a vacuum cleaner, comprising:

a dirt inlet;

a motor and fan for delivering suction to the dirt inlet;

a cyclone unit for separating particles from a flow generated by the suction of the motor and fan, comprising a vortex finder extending along a cyclone axis of rotation and an annular chamber formed around the outside of the vortex finder; and a delivery duct for delivering air to the cyclone unit such that it can flow to annular chamber, wherein the delivery duct extends in a forward airflow direction, and the outlet from the vortex finder is at a backward end of the vortex finder such that outlet from the vortex finder has a component in the opposite direction to the forward airflow direction.

A forward direction may be defined the direction in which the delivery duct extends. It is typically the direction from the dirt inlet (the head of the vacuum cleaner) to the handle. The outlet from the vortex finder is at least partially in an opposite, backward, direction and hence the outlet is at the backward end of the vortex finder, i.e. at the end which is first approached by the delivery duct. A forward location may be considered to be a distal location and a backward location may be considered to be a proximal location (i.e. proximal to the suction head and distal from the handle).

The forward end of the vortex finder is conventionally the output end. However, in this case, the forward end of the vortex finder is closed, i.e. air-impermeable, so that the air is forced to come out at the backward end, that is open.

This vacuum cleaner uses a cyclone unit in which the air delivery to the cyclone unit is in one direction and the exit from the cyclone unit is in a direction which is at least partly opposite. This means the distal end of the vortex finder is closed, and an area beyond that distal end can therefore form part of the dirt collection area. This provides additional design freedom, and in particular enables a design which is less prone to clogging, for example with hair coiled around the vortex finder.

The delivery duct is for example parallel to the axis of rotation. This defines an in-line arrangement.

The vacuum cleaner for example comprises a head having the dirt inlet, and the delivery duct comprises a tube connecting the head to the cyclone unit.

The cyclone unit is thus mounted above the head, giving a lightweight and therefore easily maneuverable head. The tube connecting the head to the cyclone unit defines the delivery duct and thereby defines the general direction in which airflow is delivered to the cyclone unit.

The vacuum cleaner for example comprises a stick vacuum cleaner.

A ceiling wall beyond the vortex finder (which is a ceiling wall of the annular chamber around the vortex finder and hence of the dirt collection chamber) is preferably spaced from the forward, closed, end of the vortex finder. This space allows separation of hairs or other fibers from around the outside of the vortex finder, so that they can more reliably be collected in the dirt chamber. The forward, closed, end of the vortex finder is thus at a distance from a ceiling wall beyond the vortex finder.

A dirt collection chamber is preferably coupled to a space beyond the forward end of the vortex finder. The forward (distal) end of the vortex chamber is closed and hence a space can be formed beyond the forward (distal) end, which is coupled to the dirt collection chamber.

The space is for example in the range 10 mm to 30 mm in height. This provides a space which assists the removal of debris around the vortex finder without adding significantly to the overall required size or significantly reducing the efficiency.

A passageway may be formed from the backward end of the vortex finder to a filter. The backward end of the vortex finder is where air exits the vortex finder.

In one example, the filter is located forward of the vortex finder. Thus, the filter is further forward than the vortex finder along the general direction of the delivery duct. The filter is then for example at the handle (user) side of the vortex finder rather than the vacuum head side. The passageway thus extends around the side of the cyclone unit and functions as a bypass. The flow through the filter is then in the forward direction. The normal in-line arrangement of components can thus still be followed, with the filter distally beyond the cyclone unit.

In another example, the filter is located backward of the vortex finder. Thus, the filter is further back than the vortex finder along the general direction of the delivery duct. The filter is then for example at the vacuum head side of the vortex finder rather than the handle (user) side.
This means the passageway can be a direct coupling from the vortex finder to the filter. The flow through the filter is then adapted to be in the backward direction. Thus, no flow redirection is needed from the vortex finder to the filter.

In this example, the dirt collection chamber can be the most forward part of the flow path of the vacuum cleaner. This is made possible by having the filter at the backward end of the cyclone unit. It means a more user-friendly emptying process for the dirt collection chamber may be enabled.

The vacuum cleaner for example comprises a rechargeable battery for operating the motor. The invention is thus of particular interest for a battery operated stick type vacuum cleaner. It is for example a dry vacuum cleaner, but the invention may be applied to a wet vacuum cleaner as well.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

Figure 1:
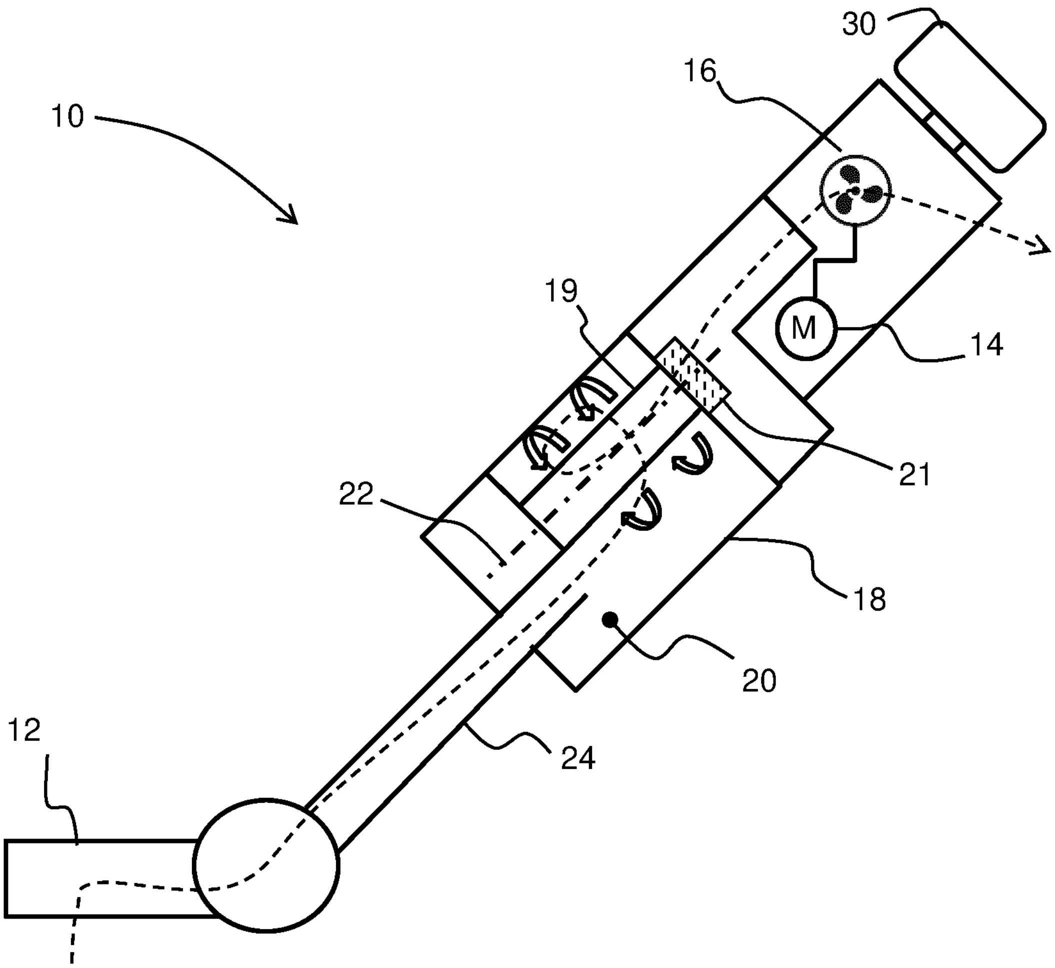
FIG. 1 shows a known cyclonic vacuum cleaner.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides a vacuum cleaner which comprises a dirt inlet and a motor and fan for delivering suction to the dirt inlet. A cyclone unit is used for separating particles from a suction flow, having a vortex finder extending along a cyclone axis of rotation and an annular chamber formed around the outside of the vortex finder. The delivery of air to the cyclone unit is in a forward direction (i.e. forward is a direction from the dirt inlet to the cyclone unit). The cyclone axis of rotation is parallel or near to parallel to this forward direction. The outlet from the vortex finder is at a backward end thereof such that outlet from the vortex finder is generally in the opposite direction to the forward component. This means the space beyond the vortex finder can be used as part of the dirt collection area, and this enables more effective collection of hairs and other debris.

FIG. 1 shows a known cyclonic vacuum cleaner 10, comprising a vacuum cleaner head 12, and a motor 14 and a fan 16 for delivering suction to the vacuum cleaner head.

A cyclone unit 18 is provided for separating particles from a flow generated by the suction of the motor and fan. The cyclone unit has a vortex finder 19 around which a helical flow is generated, and this flow occupies an annular space around the vortex finder.

The cyclone unit 18 is in this example part of a dry dirt management system, which may include additional filters. The dirt management system has a collection chamber 20 for collecting the separated dirt. This may be an internal part of the cyclone unit or there may be a separate collection reservoir to which the cyclone unit connects. An outlet filter 21 is provided between the outlet flow of the cyclone unit and the motor and fan as shown.

The cyclone unit has a cyclone axis of rotation 22 extending through the vortex finder. This axis 22 may be aligned parallel with the general length axis of the vacuum cleaner (as in the case in FIG. 1), but this is not essential.

The vacuum cleaner head 12 is connected to the cyclone unit 18 by a delivery duct 24. This defines the direction in which air is delivered to the cyclone unit, in particular to the annular space surrounding the vortex finder. The direction in which air is delivered is defined by the delivery duct 24.

In the example shown, the delivery duct 24 is parallel to the axis of rotation 22.

The direction of the delivery duct 24, hence from the vacuum cleaner head 12 to the top of the vacuum cleaner, is defined in this document as a forward direction. The air is delivered to the cyclone unit generally in this forward direction.

There is a handle 30 at the opposite end to the head 12.

The vacuum cleaner shown is a stick vacuum cleaner so that, in use, the head 12 forms the only contact with the surface to be vacuumed. Of course, it may be an upright vacuum cleaner.

The invention relates to design features of the cyclone unit, and may be applied to any vacuum cleaner with a generally in-line configuration. It may also be applied to dry vacuum cleaners with a dry DMS or to wet vacuum cleaners with a wet DMS.

A problem with the design of FIG. 1 is that hair or other debris (threads etc.) can become tangles around the vortex finder. This provides a flow obstruction which reduces the air flow speeds and thereby reduced the dirt separation efficiency.

Figure 2:
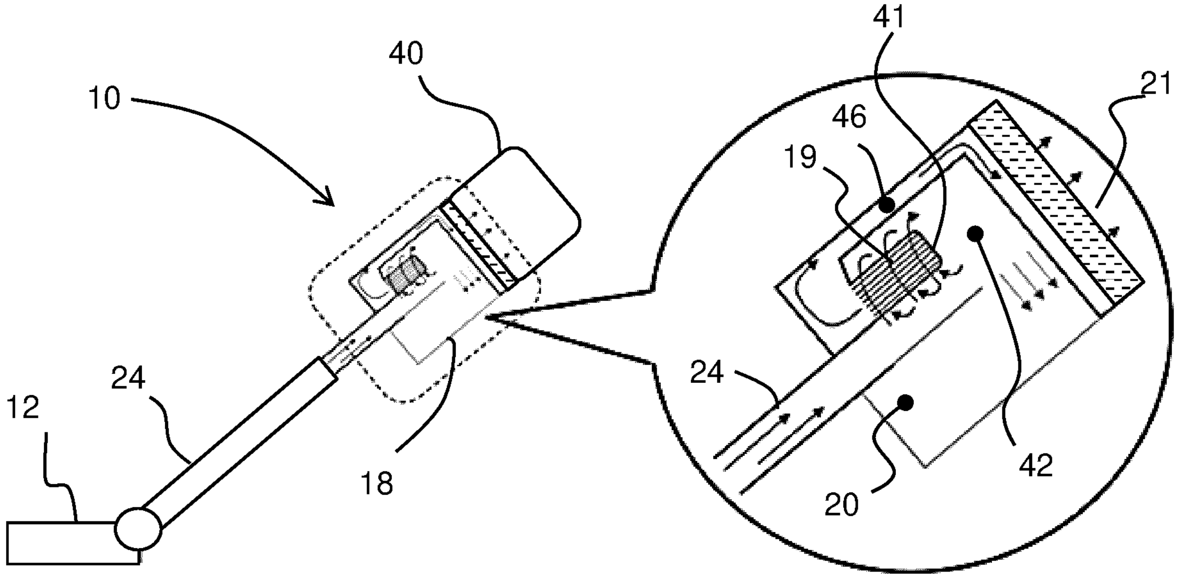
FIG. 2 shows a first example of cyclonic vacuum cleaner in accordance with the invention in schematic form.

FIG. 2 shows a first example in accordance with the invention. The same reference numerals are used as in FIG. 1.

The general configuration of the vacuum cleaner is the same, in that it comprise a dirt inlet 12, and a motor and fan for delivering suction to the dirt inlet. The motor and fan, as well as the user interface, control electronics and handle are represented schematically as unit 40.

A cyclone unit 18 is again for separating particles from a flow generated by the suction of the motor and fan, comprising a vortex finder 19 extending along a cyclone axis of rotation 22 and an annular chamber formed around the outside of the vortex finder.

A delivery duct 24 delivers air to the cyclone unit. The delivery duct extends in the forward direction as explained above, which corresponds to the general direction between the dirt inlet (the head of the vacuum cleaner) and the handle.

In the design of the invention, the outlet from the vortex finder 19 is at least partially in a backward direction (opposite to the forward direction of the delivery duct) and hence the outlet is at the backward end of the vortex finder, i.e. at the end first approached by the delivery duct. The forward end of the vortex finder is closed, so that air cannot exit the vortex finder in the forward direction, but has to exit in the backward direction.

The arrangement of the cyclone unit can be seen more clearly in the enlarged part of FIG. 2.

In FIG. 2 the air delivery direction to the cyclone 18 is fully opposite to the exit direction from the cyclone because of the parallel duct 24 and axis 22. However, it is not essential that the rotation axis 22 is parallel to the forward direction. There may be an angle between them.

This arrangement means the most forward (distal) end 41 of the vortex finder is closed, and the area beyond that closed end can form part of the dirt collection area. This provides additional design freedom, and in particular enables a design which is less prone to clogging, for example with hair coiled around the vortex finder. For example, space 42 can be provided to allow hair to unclog and collect better in the dirt collection chamber. This space 42 is made possible because a forward wall i.e. ceiling 44 of the annular chamber around the vortex finder, i.e. a ceiling 44 of the dirt collection chamber, is spaced from the forward end 40 of the vortex finder.

The dirt collection chamber 20 is coupled to this space 42

Figure 3:
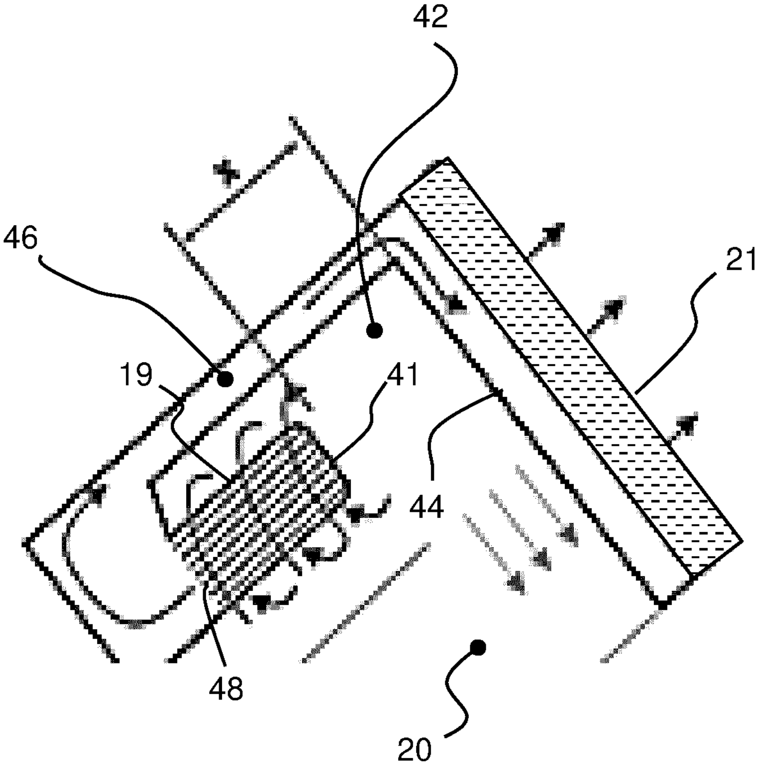
FIG. 3 shows the cyclone unit of FIG. 2 enlarged.

As shown in FIG. 3, the space 42 for example has a dimension in the forward-backward direction of x. This dimension may be in the range 10 mm to 30 mm.

The space needs to be sufficient to allow collected fibers to pass over the closed end of the vortex finder. The space is therefore preferably at least ten times the diameter of the fibers which may become caught, e.g. at least 3 mm. A larger space is desired because there is a flow gradient between the helical flow around the vortex finder and a (more) static air at the ceiling above the vortex finder. For this reason, the space is more preferably at least 10 mm. There is a maximum desired space because the energy required to generate the helical flow in the space is not contributing to the separation function of the cyclone unit, so a large space corresponds to a reduction in efficiency. For this reason, the space is preferably less than 30 mm in height.

By way of example the vortex finder may have a diameter of the order of 30 to 45 mm (for a stick type vacuum cleaner) and an axial length of the order of 25 to 50 mm.

FIG. 3 also shows a passageway 46 which redirects the backward outlet flow from the vortex finder to the forward direction, towards the outlet filter 21 which, as in the example of FIG. 1, is located forward of the vortex finder. This arrangement thus maintains the same in-line sequence of components as in the conventional design of FIG. 1 so that the overall design of the vacuum cleaner does not need to be significantly revised in order to incorporate the improved cyclone unit. In particular, the improved cyclone unit implements a distance between the vortex finder and a ceiling 44 of the chamber around the vortex finder. This spacing, and the reversed outlet direction from the vortex finder, would normally not allow the in-line configuration to be maintained.

Figure 4:
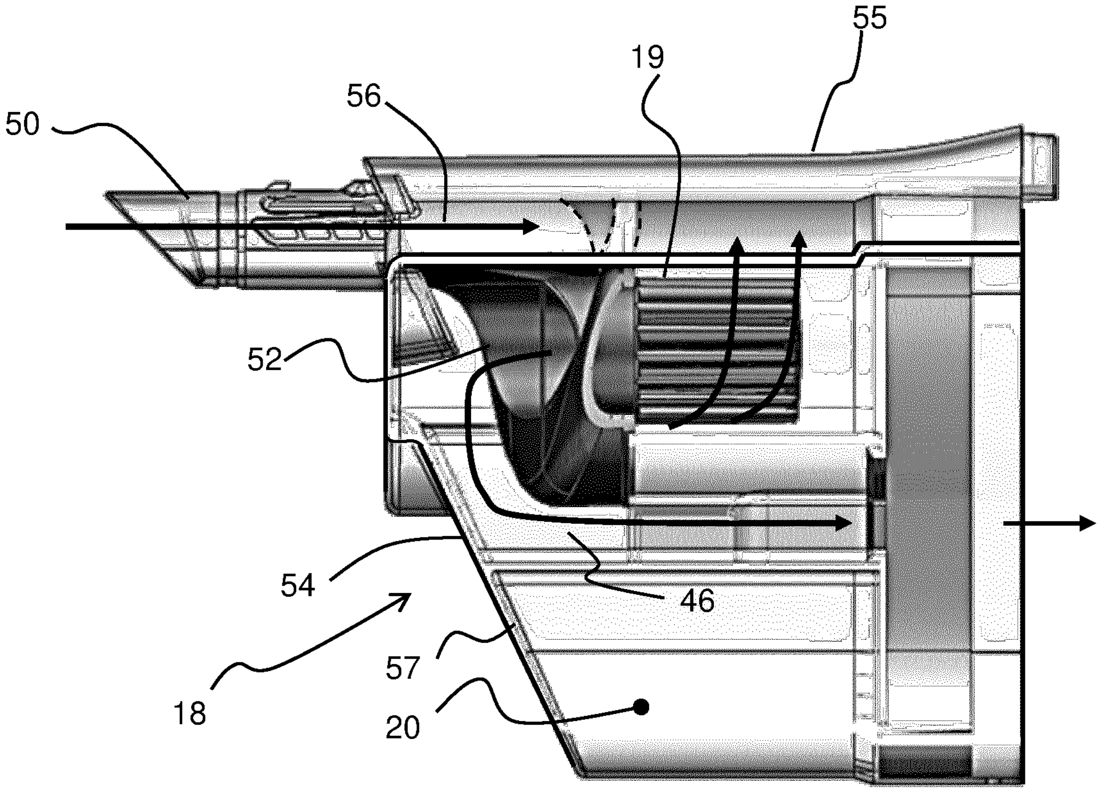
FIG. 4 shows a first view of the cyclone unit for a more detailed example operating in the same way as the schematic example of FIG. 2.

FIG. 4 shows a first view of the cyclone unit 18 for a more detailed example, but which operates in the same way as the schematic example of FIG. 2. The filer and the fan and motor assembly are not shown in FIG. 4.

The delivery duct 24 is coupled to an inlet 50 at the backward end of the cyclone unit 18. This inlet connects to the cyclone body 52 within a main housing 54 of the cyclone unit 18. The main housing 54 has a cover 55. The inlet airflow 56 from the delivery duct (which connects to the inlet 50) is directed to the annular space around the vortex finder 19. The circulatory flow is created by a ramp surface, and the exit flow from the vortex finder is in the opposite direction to the inlet airflow 54. As mentioned above, the passageway 46 redirects this flow to the forward direction, and the exit flow from the overall cyclone unit 18 is in the forward direction.

The dirt collection chamber may be emptied by opening a flap 57 at the backward end of the cyclone unit. This means the cyclone unit can be emptied without detaching the cyclone unit from the rest of the vacuum cleaner. Alternatively, the dirt collection chamber may be detachable. The cyclone unit can be cleaned by removing the filter unit from the forward end.

Figure 5:
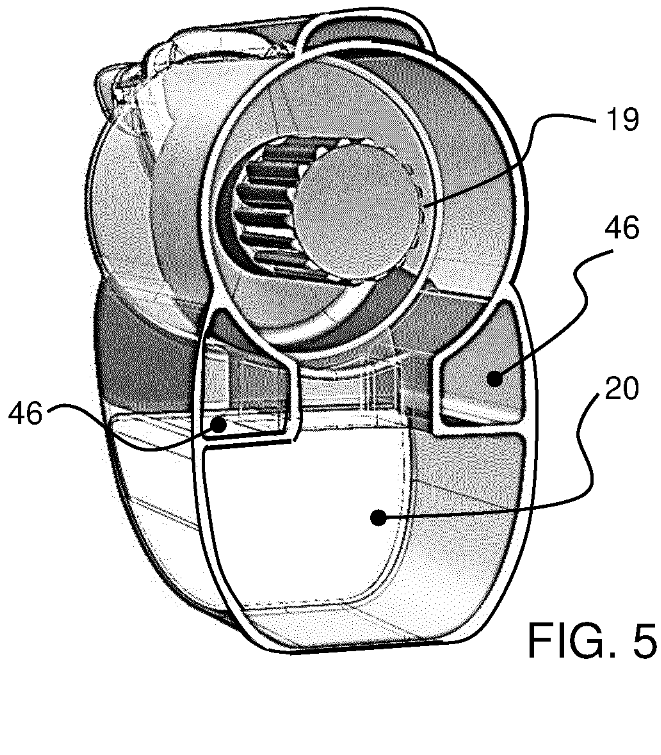
FIG. 5 shows a second view of the cyclone unit of FIG. 4.

FIG. 5 shows a second view of the cyclone unit of FIG. 4, looking into the forward end. The vortex finder 19 and the collection chamber 20 can be seen. In addition, it can be seen that there are two bypass channels 46 which extend from the backward end of the cyclone unit to the forward end, towards the filter 21.

The channels for example have approximately the same cross sectional area (in combination) as the inlet, so they do not present a significant flow restriction.

Figure 6:
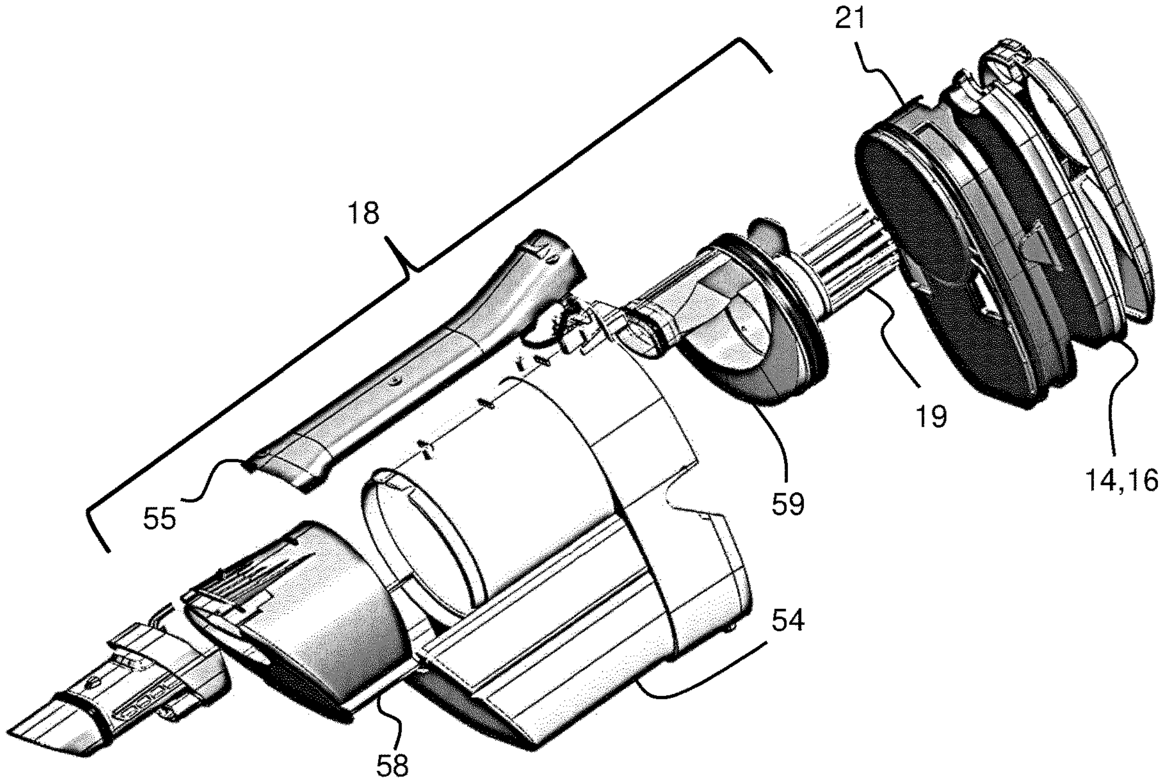
FIG. 6 is a first exploded view of a vacuum cleaner using the cyclone unit of FIG. 4.

FIG. 6 is a first exploded view of a vacuum cleaner using the cyclone unit 18 of FIG. 4. The cyclone unit has a cyclone bottom 58 upstream of the main housing 54. A flow unit 59 defines the cyclone entrance, exit and ramp surface for promoting the circulatory flow. The vortex finder 19 is at the forward end of the flow unit 59. The filter 21 comprises an assembly at the forward end of the cyclone unit 18. The fan and motor assembly 14, 16 is attached over the filter 21.

Figure 7:
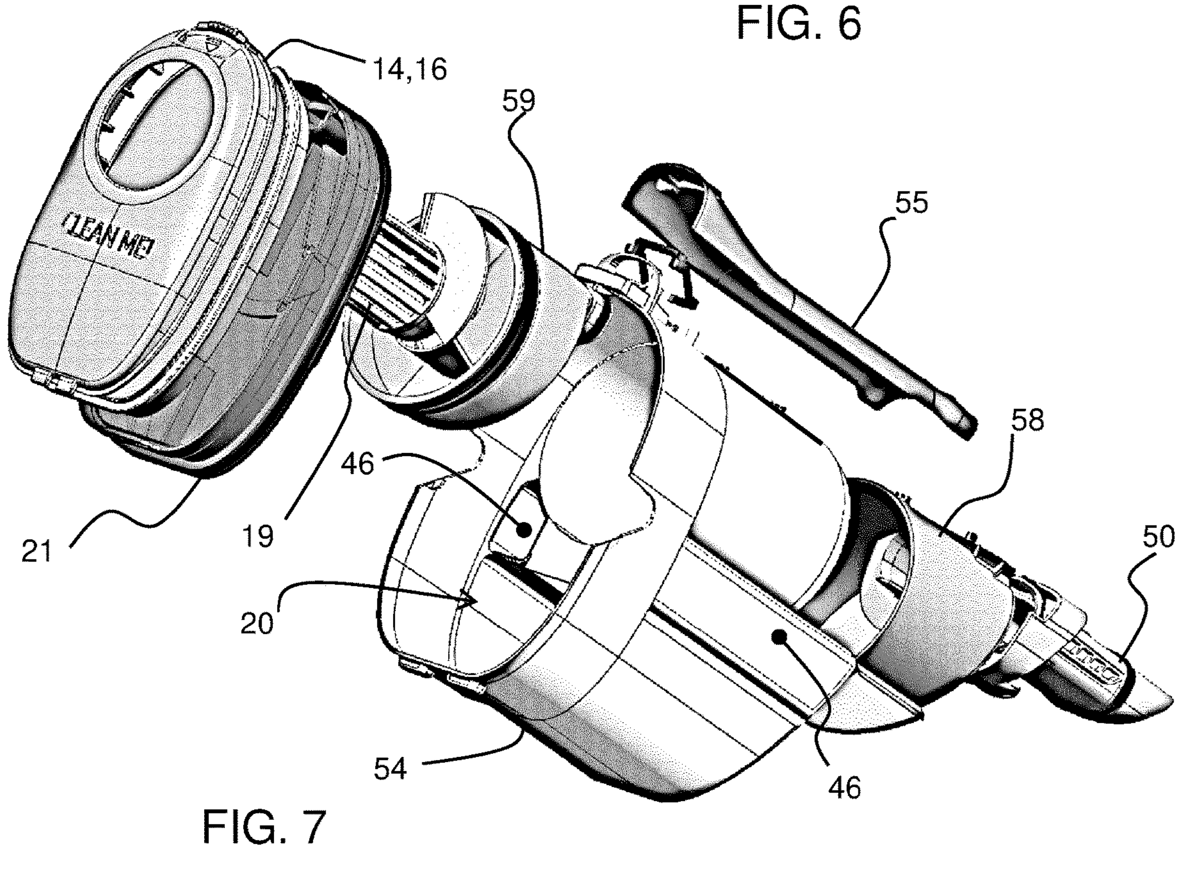
FIG. 7 is a second exploded view of a vacuum cleaner using the cyclone unit of FIG. 4.

FIG. 7 is a second exploded view of the vacuum cleaner using the cyclone unit of FIG. 4.

The example of FIGS. 2 to 7 has a passageway 46 (or passageways) from the backward end 48 of the vortex finder to the filter 21. The passageway extends to beyond the front end of the chamber which forms the closed space of the cyclone unit, so the filter is located forward of the vortex finder (both in physical location and in terms of the flow path). The passageway 46 extends around the side of the cyclone unit and functions as a bypass path. It may in practice comprise multiple channels.

The normal in-line arrangement of components is this used, with the bypass path 46 enabling the outlet from the vortex finder to be in the reverse direction.

Figure 8:
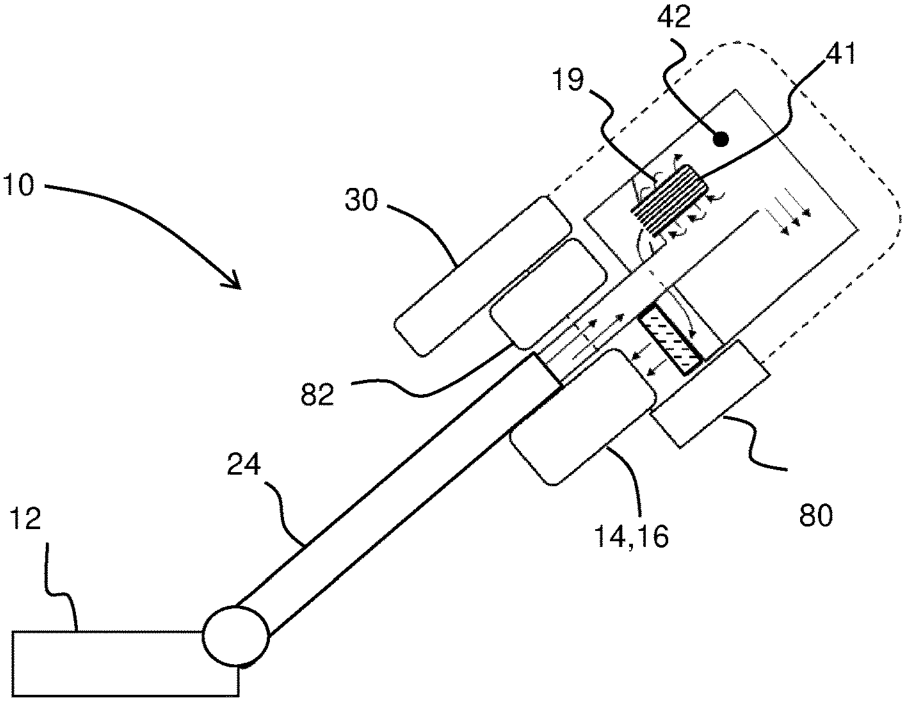
FIG. 8 shows a second example of cyclonic vacuum cleaner.

FIG. 8 shows a second example in which the filter 21 is located backward of the vortex finder. This means the passageway 46 can be a direct coupling from the vortex finder 19 to the filter 21. The flow through the filter 21 is in the backward direction. Thus, no flow redirection is needed from the vortex finder to the filter.

Figure 9:
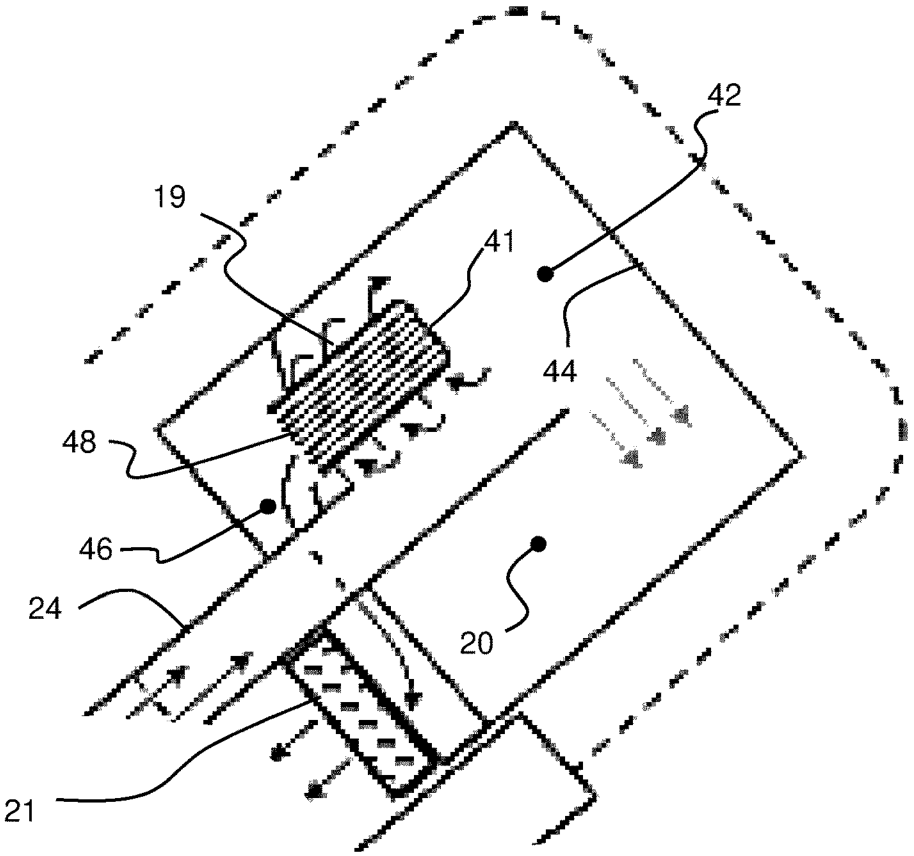
FIG. 9 shows the cyclone unit of FIG. 8 enlarged.

FIG. 9 shows an enlarged view of the cyclone unit.

In this example, the dirt collection chamber 20 can be the most forward part of the vacuum cleaner or closest to the handle.

The other components (for example motor and fan 14, 16, handle 30, battery 80 and electronics 82) may all be further down the vacuum cleaner than the collection chamber 20. This is made possible by having the filter 21 at the backward end of the cyclone unit 19. It means a more user-friendly emptying process for the dirt collection chamber may be enabled.

The vortex finder may be shortened to provide the space 42, or else the cyclone unit may be lengthened, compared to the design of FIG. 1.

FIG. 10 schematically shows two different configurations. The exit flow from the vortex finder is shown as flow arrow 90. In both cases, this flow may lead directly to the filter 21 or it may be routed forward. Thus either of the approaches explained above may be used. The debris path is shown as 92.

Figure 10A:
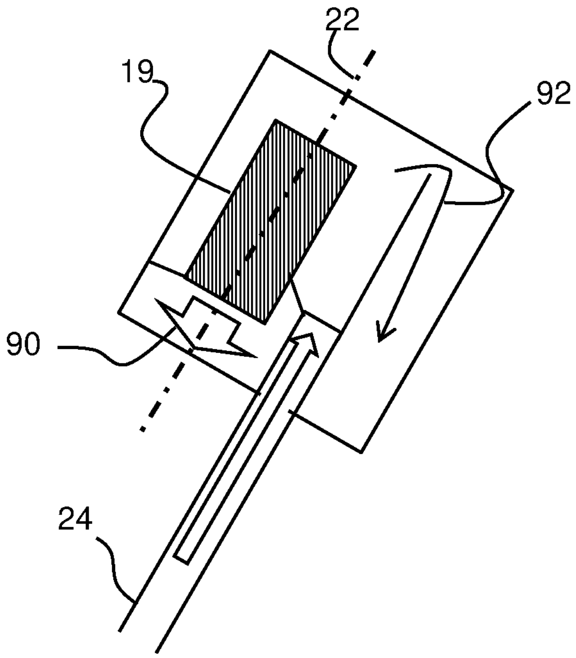
FIGS. 10A and 10B show two different relative orientations of the cyclone unit and the delivery duct.

FIG. 10A corresponds to the examples above, with the delivery duct extending parallel to the cyclone axis.

Figure 10B:
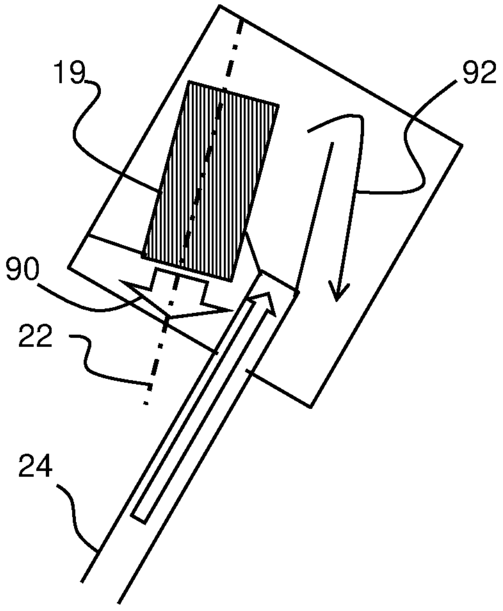

FIG. 10B shows that the cyclone axis 22 may be offset from the forward direction of the delivery duct 24, for example by up to 60 degrees. Preferably, the angle between the delivery duct axis (i.e. the forward direction) and the cyclone axis of rotation is less than 30 degrees, and preferably less than 10 degrees. Thus, the configuration is preferably a parallel in-line arrangement of the cyclone unit. The outlet from the vortex finder is still generally backward (i.e. it has a backward component) whereas the delivery duct extends forwards.

The general air delivery direction to the cyclone unit is in the forward direction as previously defined. However, once within the cyclone unit as a whole, internal air passages may change the airflow direction locally, before the air flows to the annular space around the vortex finder. This local direction control, internally of the cyclone unit, for example may create a partly radially inward direction to the flow, to promote the desired helical flow conditions within the cyclone unit.

The delivery duct is shown in the examples above to connect directly to the cyclone unit. This is only schematic. The delivery duct, which may be a removable suction tube, may in fact connect to a housing which has internal passageways leading to the annular chamber of the cyclone unit.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality.

The mere fact that certain measures are recited in mutually different dependent claims does not indicate that a combination of these measures cannot be used to advantage.

If the term "adapted to" is used in the claims or description, it is noted the term "adapted to" is intended to be equivalent to the term "configured to".

Any reference signs in the claims should not be construed as limiting the scope.

The invention claimed is:

1. A vacuum cleaner, comprising:
- a dirt inlet;
- a motor and fan for delivering suction to the dirt inlet;
- a cyclone unit for separating particles from a flow generated by the suction of the motor and fan, comprising a vortex finder extending along a cyclone axis of rotation and an annular chamber formed around outside of the vortex finder, the annular chamber having a ceiling wall; and
- a delivery duct for delivering air to the cyclone unit such that the air flows to the annular chamber, wherein the delivery duct extends in a forward airflow direction, and an outlet from the vortex finder is at a backward end thereof such that the outlet from the vortex finder has a component in an opposite direction to the forward airflow direction, wherein:
- a space is provided between a forward end of the vortex finder and the ceiling wall of the annular chamber, wherein the ceiling wall is at a distance from the forward end of the vortex finder, and in that the vacuum cleaner further comprises:
- a filter located forward of the vortex finder; and
- a passageway that extends from the backward end of the vortex finder to beyond the forward end of the annular chamber leading to the filter, wherein the backward end of the vortex finder is where air exits the vortex finder.

2. The vacuum cleaner of claim 1, wherein the delivery duct is substantially parallel to the cyclone axis of rotation.

3. The vacuum cleaner of claim 1, comprising a head having the dirt inlet, wherein the delivery duct comprises a tube connecting the head to the cyclone unit.

4. The vacuum cleaner of claim 1, comprising a stick vacuum cleaner.

5. The vacuum cleaner of claim 1, further comprising a dirt collection chamber coupled to an outlet of the cyclone unit and coupled to the space.

6. The vacuum cleaner of claim 1, wherein the space has a height in the range 10 mm to 30 mm.

7. The vacuum cleaner of claim 1, wherein the flow through the filter is adapted to be in the forward airflow direction.

8. The vacuum cleaner of claim 1, wherein the motor and fan are downstream of the filter.

9. The vacuum cleaner of claim 1, comprising a rechargeable battery for operating the motor.

* * * * *